United States Patent
Moore et al.

(10) Patent No.: US 9,964,431 B1
(45) Date of Patent: May 8, 2018

(54) NARROW BANDWIDTH DETECTION OF VIBRATION SIGNATURE USING FIBER LASERS

(71) Applicant: National Technology & Engineering Solutions of Sandia, LLC, Albuquerque, NM (US)

(72) Inventors: Sean Moore, Los Angeles, CA (US); Daniel B. S. Soh, Pleasanton, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 126 days.

(21) Appl. No.: 14/541,609

(22) Filed: Nov. 14, 2014

(51) Int. Cl.
  *G01B 9/02* (2006.01)
  *G01H 9/00* (2006.01)

(52) U.S. Cl.
  CPC .......... *G01H 9/00* (2013.01); *G01B 9/02007* (2013.01); *G01B 9/02084* (2013.01)

(58) Field of Classification Search
  CPC ... G01H 9/00; G01B 9/02007; G01B 9/02084
  See application file for complete search history.

(56) References Cited

U.S. PATENT DOCUMENTS

| 3,942,878 | A | * | 3/1976 | Engel | B23K 26/0626 |
| | | | | | 219/121.61 |
| 5,621,514 | A | * | 4/1997 | Paranto | B60T 7/22 |
| | | | | | 180/169 |
| 5,835,199 | A | * | 11/1998 | Phillips | G01S 7/4802 |
| | | | | | 356/28.5 |
| 6,191,385 | B1 | * | 2/2001 | O Loughlin | B23K 26/702 |
| | | | | | 219/121.6 |
| 8,265,375 | B2 | * | 9/2012 | Shirley | G06T 7/0057 |
| | | | | | 356/600 |
| 2013/0104661 | A1 | * | 5/2013 | Klotz | G01H 9/00 |
| | | | | | 73/657 |

OTHER PUBLICATIONS

D. Jin, et al., "Stable passively Q-switched and gain-switched Yb-doped all-fiber laser based on a dual-cavity with fiber Bragg gratings", Optics Express, vol. 21, Issue 22, pp. 26027-26033 (2013).

(Continued)

*Primary Examiner* — R. A. Smith
*Assistant Examiner* — John M Royston
(74) *Attorney, Agent, or Firm* — Medley, Behrens & Lewis, LLC

(57) ABSTRACT

The various technologies presented herein relate to extracting a portion of each pulse in a series of pulses reflected from a target to facilitate determination of a Doppler-shifted frequency for each pulse and, subsequently, a vibration frequency for the series of pulses. Each pulse can have a square-wave configuration, whereby each pulse can be time-gated to facilitate discarding the leading edge and the trailing edge (and associated non-linear effects) of each pulse and accordingly, capture of the central portion of the pulse from which the Doppler-shifted frequency, and ultimately, the vibration frequency of the target can be determined. Determination of the vibration velocity facilitates identification of the target being in a state of motion. The plurality of pulses can be formed from a laser beam (e.g., a continuous wave), the laser beam having a narrow bandwidth.

13 Claims, 5 Drawing Sheets

(56) References Cited

OTHER PUBLICATIONS

R. Ebert, et al., "Applications for remote laser vibration sensing", Photonics Global, Singapore 2008, pp. 1-5 (2008).
R. Ebert, et al., "Vibration imagery of remote objects", Free-Space Laser Communication and Laser Imaging II, Proceedings of SPIE vol. 4821, 2002, pp. 1-10 (2002).
M. Mathers, et al., "Fibre Laser Doppler Vibrometry System for Target Recognition", Smart Structures, Devices and Systems II, Proceedings of SPIE vol. 5649, pp. 219-226 (2005).

* cited by examiner

NARROW BANDWIDTH DETECTION OF VIBRATION SIGNATURE USING FIBER LASERS

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Remote laser vibration sensing (also known as vibrometry) is finding application in a multitude of scenarios such as target recognition in civilian and combat scenarios, mine detection, etc., whereby a target can be detected based upon an effect a motion of the target has upon an incident pulsed beam. In short range applications (e.g., a few meters distance), laser vibrometry can be utilized to test mechanical structures with respect to their vibration characteristics. At longer ranges (e.g., in the order of several kilometers), effects such as whether a vehicle is positioned with its engine idling can be determined. In operation, a laser beam associated with a known frequency is directed towards an object that is subject to vibration (e.g., the object is vibrating). The laser beam is reflected from the object, whereby over time, the vibration of the object can cause the reflected signal to scatter. Thus, as the object vibrates, a Doppler effect can arise in the scattered signals that are reflected by the object. By determining a shift in the Doppler frequency, and accordingly, the vibration frequency, it is possible to determine a magnitude of vibration, e.g., due to the motion of the idling engine.

To facilitate object detection (e.g., by the Doppler-shifted frequency of a scattered or returned signal) over longer ranges can require a laser beam to have a high magnitude of power in a very narrow frequency band compared with a laser beam that is utilized for shorter ranged applications. A laser beam reflected from an object(s) having an uneven surface(s) can result in dispersion of the reflected energy over wide spatial angles and, thus, the detected power can be significantly reduced, especially for a long-range detection. Such reduction in power can necessitate utilization of a high power laser source. Vibrometry at the longer ranges can often only be achieved using lasers with a very narrow band (e.g., in the 1 kHz band range), in both continuous wave (CW) mode and pulsed mode. However, utilizing higher power lasers can also introduce an issue of non-linear effects, where such non-linear effects can act to spectrally broaden the laser beam. Accordingly, such non-linear effects can further render it difficult to demodulate a vibration signature in a reflected pulse(s) as the broadening 'washes out' the vibration signature. Hence, while technology exists to perform laser vibrometry over an extended distance, the ability to accurately determine the vibration frequency of an object can be hindered by broadening of a laser signal with regard to loss in focused power and also washing out of the vibration signature.

SUMMARY

The following is a brief summary of subject matter that is described in greater detail herein. This summary is not intended to be limiting as to the scope of the claims.

Various exemplary embodiments presented herein relate to extracting a portion of a pulse of a reflected signal to facilitate determination of a Doppler-shifted frequency for the pulse, and to further facilitate determination of a vibration frequency of an object from which the signal was reflected. In an exemplary embodiment a system is presented, wherein the system comprises an analyzer component configured to receive a first pulse, wherein the first pulse can be included in a signal (that comprises a series of pulses) reflected from a target, the first pulse comprises a first non-linear effect associated with a leading edge portion of the first pulse. The analyzer component can further receive a second non-linear effect associated with a trailing edge portion of the first pulse, and further a central portion of the first pulse, the central portion of the first pulse is located between the leading edge portion of the first pulse and the trailing edge portion of the first pulse. In an embodiment, the analyzer component can be further configured to extract the central portion of the first pulse, the extraction based at least in part on discarding the leading edge portion of the first pulse and the trailing edge portion of the first pulse.

Another exemplary embodiment comprises a method for determining a motion of a target, wherein the method comprises receiving a plurality of pulses reflected from a target, wherein each pulse in the plurality of pulses has a square-wave profile, the square-wave profile including a leading edge portion, a flat-top portion, and a trailing edge portion, wherein the flat-top portion is located between the leading edge portion and the trailing edge portion. The method further comprises determining, for each pulse in the plurality of pulses, the respective leading edge portion and the respective trailing edge portion and extracting, for each pulse in the plurality of pulses, the respective flat-top portion based at least in part on discarding the respective leading edge portion and the respective trailing edge portion for each pulse in the plurality of pulses.

A further exemplary embodiment comprises a method for determining a Doppler-shift frequency of a radar pulse, the method comprises receiving a pulse, the pulse having a square-wave profile, the square-wave profile including a leading edge portion, a central portion, and a trailing edge portion, wherein the central portion can be located between the leading edge portion and the trailing edge portion. The method further comprises determining, for the pulse, the leading edge portion and the trailing edge portion, where the method further comprises extracting the central portion of the pulse, based at least in part on discarding the leading edge portion and the trailing edge portion. Further, the method includes determining a frequency of the central portion and determining a Doppler-shift frequency for the central portion based at least in part on determining a difference between the frequency of the central portion and a frequency of a reference signal, wherein the pulse and the reference signal are formed from a common laser beam.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
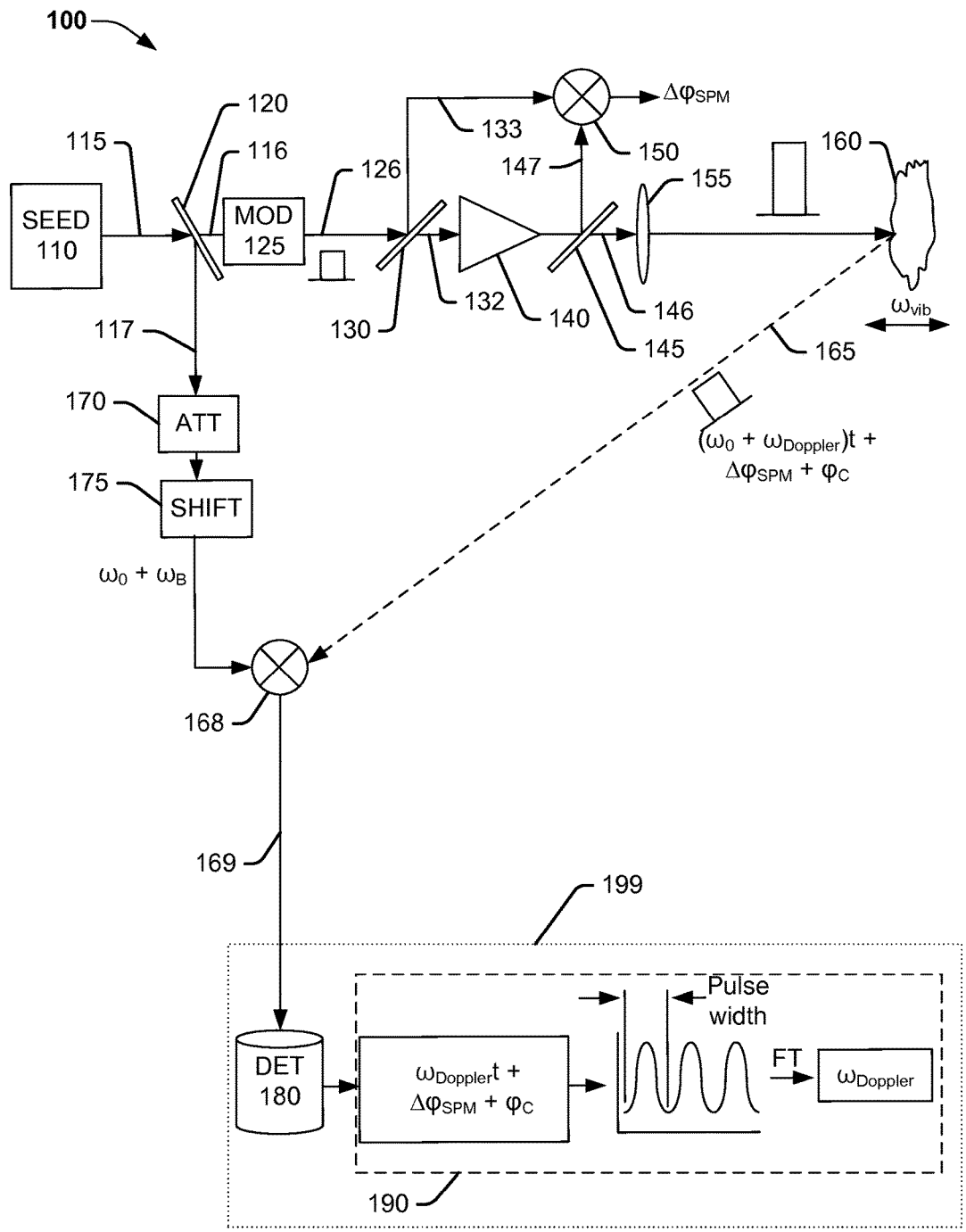
FIG. 1 presents a block diagram of a system configured to facilitate determining a vibration frequency for at least one radar pulse reflected from a target, according to an embodiment.

Various technologies pertaining to determining a vibration frequency for at least one radar pulse reflected from a target are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein relate to extracting a portion of each pulse in a series of pulses reflected from a vibrating target to facilitate determination of a Doppler-shifted frequency for each pulse and, subsequently, a vibration frequency for the series of pulses. Determination of the vibration frequency facilitates determination of whether the target is in a state of motion, where the motion can be a function of a parked vehicle oscillating back and forth owing to its engine idling. Alternatively, the motion can be a function of the target being in motion, e.g., a vehicle is moving across a landscape, an object is flying, etc. With conventional systems, the ability for a process (e.g., a vibrometry operation) to determine a Doppler-shifted frequency of a target at a relatively long distance is hindered by non-linear effects 'washing-out' at least one pulse being received (e.g., as a function of scattering, spectral broadening associated with self-phase modulation (SPM)) from a target. Where a relatively long distance can be of any distance, for example, between about 1 kilometer (1 km) to about 5 km's, or between about 5 km's and about 10 km's, or between about 10 km's and about 40 km's, or between about 5 km's and 40 km's, or between about 1 km and 50 km's, etc. The at least one pulse can be received in a signal that comprises a stream of a plurality of pulses. As the power of a signal emitted from a source is increased, to facilitate vibrometry over an extended distance, any non-linear effects which may exist, e.g., as a result of a source generation process, can be increased and/or magnified. Such non-linear effects can distort the phase of the optical signal, which is detrimental for detecting vibrations. However, in an aspect, the non-linear effects can be confined to the leading edge and trailing edge of a pulse waveform. Hence, each pulse can be time-gated to facilitate discarding of the leading edge and the trailing edge (and associated non-linear effects) of each pulse and accordingly, capture the portion of the pulse from which the Doppler-shifted frequency, and ultimately, the vibration frequency of the target, can be determined. Conventional systems (e.g., optical heterodyne architectures) utilizing narrowband CW fiber lasers are currently restricted to a few km's by SPM which can limit the optical power of a signal (e.g., each pulse in a signal) to a few watts. The various embodiments presented herein enable the generation of pulses having a power of about 10 kW, or three orders of magnitude improvement in power over the conventional systems, suitable for detection of mechanical vibrations with amplitudes on the order of tens of microns oscillating at hundreds of hertz FIG. 1 presents an exemplary system 100 configured to detect, with a laser (e.g., a narrow band laser), vibration (or motion) of an object. A seed component 110 is configured to generate a laser beam 115 (e.g., a continuous wave (CW) laser beam) having a suitable wavelength and bandwidth. For example, the laser beam can have a wavelength of between about 500 nanometers (nm) and about 2 micrometers (μm). The laser beam 115 can also have a narrow bandwidth (e.g., less than about 100 kHz). A first beam splitter 120 is positioned relative to the seed component 110 to receive and split the laser beam 115 into a first beam 116 and a second beam 117. The beam splitter 120 directs the first beam 116 along a first path and the second beam 117 along a second path. In an aspect, the beam splitter 120 can direct between 1-10% of laser beam 115 along the second path to form the second beam 117, and the beam splitter 120 can direct the remaining 90-99% of laser beam 115 along the first path to form the first beam 116, whereby the second beam 117 can act as a reference signal.

A modulator 125 (e.g., an electro-optic modulator) is positioned relative to the beam splitter 120 to receive the first beam 116, wherein the modulator 125 is configured to 'chop' (e.g., time-gate) the first beam 116 into a series of square pulses 126. In an exemplary embodiment, the modulator 125 can operate with a repetition rate of between about 10 kHz to about 100 kHz and generate pulses having a flat-top, nominally square profile having a duration of about 100 ns. It is to be appreciated that the repetition rate and pulse duration can be of any suitable value for a particular application, for example, while the various embodiments presented herein relate to a pulse duration of 100 ns, the duration can be one microsecond, one millisecond, 500 milliseconds, etc.

A second beam splitter 130 is positioned relative to the modulator 125 to receive the pulses 126. The second beam splitter 130 separates the pulses 126 into a first portion of pulses 132 and a second portion of pulses 133. An amplifier 140 is positioned relative to the second beam splitter 130 to receive the first portion of pulses 132, whereby the amplifier 140 can be utilized to amplify the signal strength of the first portion of pulses 132, thereby generating an amplified signal. In an exemplary embodiment, the amplifier can be a fiber amplifier such as a large mode area (LMA) fiber amplifier. In an embodiment, the first portion of pulses 132 can have an energy in the nano joules (nJ) range (e.g., about $1 \times 10^{-9}$ J) with amplifier 140 facilitating amplification of the first portion of pulses 132 to the milli-joule (mJ) range (e.g., about $1 \times 10^{-3}$ J).

In an aspect, non-liner effects can be introduced as a function of the formation of the first portion of pulses 132 (and ultimately, pulses that are emitted from the system 100). The non-linearity is caused by the Kerr effect, whereby the phase of the optical waveform can be retarded proportionally to its instantaneous power. Thereby, an optical waveform that quickly changes in amplitude with respect to time would experience a non-uniform phase distortion over time. For example, the modulator 125 with the following amplification through the amplifier 140 can introduce non-linear effects as the modulator 125 'chops' the first beam 116. An ideal amplitude modulator would produce an ideal square pulse. However, any practical amplitude modulator would inevitably generate the leading edge and the trailing edge, where the amplitude changes quickly over time. These edges, when amplified through the amplifier 140, would experience a non-uniform phase distortion due to the Kerr effect. A pulse can comprise a first non-linear effect (e.g., a first non-linearly distorted phase) associated with the leading edge portion of the pulse and a second non-linear effect (e.g., a second non-linearly distorted phase) associated with the trailing edge portion of the first pulse.

As shown in FIG. 1, a time-gated mixing operation can be performed to facilitate measurement of any residual SPM occurring as part of the amplification process being facilitated by the amplifier 140. While the amplifier 140 may be amplifying the pulses to ultimately be transmitted, the amplifier 140 may introduce any non-linear effect(s) due to the pulse shaping through the modulator 125. The non-linearly distorted phase can create substantial ambiguity in a Doppler-shifted frequency in a return signal. In an aspect, a third beam splitter 145 can be positioned relative to the amplifier 140 to receive the amplified signal output by the amplifier 140. The third beam splitter 145 splits the amplified signal into a transmission signal 146 and an output signal 147. An interferometric mixer device 150 mixes the second portion of pulses 133 output by the second beam splitter 130 and the output signal 147 output by the third beam splitter 145. A homodyning process utilizing the mixed optical signal through the interferometric mixer device 150 determines a change in SPM (e.g., $\Delta\phi_{SPM}$) introduced by the amplifier 140 based upon the second portion of pulses 133 and the output signal 147. For example, if the amplifier 140 does not introduce any non-linearly distorted phase, the homodyne output will be zero. Even the flat portion of the nominally square pulse prepared by the modulator 125 experiences the non-linearly shifted phase through the amplifier 140, due to the Kerr effect. Knowledge of $\Delta\phi_{SPM}$ for the flat portion of the nominally square pulse can be subsequently utilized to facilitate determination of the Doppler shifted frequency of a returning signal 165. Further, owing to the various embodiments presented herein, knowledge of $\Delta\phi_{SPM}$ associated with the leading and the tailing edge of a nominally square pulse can also be discarded.

The system 100 includes a lens 155, where the third beam splitter 145 directs the transmission signal 146 to the lens 155. The lens 155 is configured to collimate the transmitted signal. In an embodiment, as previously mentioned, the transmission signal 146 comprises a pulse with a time duration of about 100 ns in combination with a pulse energy of about 500 µJ.

In an aspect, the seed component 110, the modulator 125, the amplifier 140, and other associated components can be considered to comprise a transmitter configured to transmit the transmission signal 146.

As shown in FIG. 1, the transmission signal 146 is transmitted towards, and reflects off, target 160. A detector 180 detects a series of reflected (or scattered) pulses 165 reflected from the target 160. As shown in FIG. 1, target 160 can be in a state of vibration (e.g., the target is a stationary vehicle with the engine running), where the vibration can have a frequency $\omega_{vib}$. Hence, the optical frequency of the reflected pulses 165 can be affected by a degree of Doppler-shifting, whereby the Doppler-shifting can be generated as a function of the vibration frequency $\omega_{vib}$. Reflected pulses 165 can also have an arbitrary phase associated with them. In an aspect the Doppler-shifted frequency of the reflected pulses 165 can scale as the product of the amplitude and frequency of the vibration are imprinted on the reflected pulses 165.

As shown in FIG. 1, the time dependent optical phase of the returning beam is $(\omega_0+\omega_{Doppler})t+\Delta\phi_{SPM}+\phi_C$ where $\omega_0$ is the initial frequency, $\omega_{Doppler}$ is the Doppler-shifted frequency. The additional phase term $\phi_C$ can be a function of the transmission signal 146 and/or the reflected pulse(s) 165 passing through the atmosphere (e.g., a volume of air between the system 100 and the target 160), for example. In an aspect, the atmospheric effects can further introduce non-linear effects, however, the magnitude of the effects can be reduced by utilizing a laser beam having a wavelength which provides a degree of immunity to such atmospheric effects, e.g., a wavelength of less than about 2 µm. Hence, a degree of fluctuation (fade) in signal amplitude (e.g., the amplitude of a first pulse in the transmission signal 146 and the amplitude of a second pulse in the transmission signal 146) may occur but the pulse frequency may be minimally affected.

As further shown in FIG. 1, the reflected pulse(s) 165 can be combined with the second beam 117, whereby the second beam 117 did not undergo modulation and hence is still in the form of a narrow band laser, e.g., a CW beam. As previously mentioned, second beam 117 can be utilized as a reference signal against which a Doppler-Shift frequency of a received pulse 165 can be measured. To that end, an attenuator 170 can receive the second beam 117 and attenuate such beam. An acousto-optic (AO) filter 175 receives the attenuated beam output by the attenuator 170, and shifts the frequency of the attenuated beam. The frequency shifting operation can be considered to be a local oscillator operation, with the frequency of the second beam 117 being defined as $\omega_0+\omega_B$, where $\omega_B$ is the degree of acousto-optic shift introduced by the acousto-optic (AO) filter 175, e.g., an AO modulation frequency. Having the local oscillator frequency shifted by $\omega_B$ makes a detection system (e.g., detector 180) a heterodyne detector (where the local oscillator frequency is different from the carrier frequency of the analyzed signal), rather than a homodyne detector (where the local oscillator frequency is the same as the carrier frequency of analyzed signal). The conventional art of the heterodyne detection is advantageous to homodyne detection since the analysis can be immune to the low-frequency noises, which are ever present in all electronics.

As noted above, the reflected signal 165 is mixed with the local oscillator (which is the output of the AO filter 175) through a mixer element 168, (e.g., an interferometric mixer element) to form a heterodyned signal 169. A detector detects the interferometric mixed signal after the mixer element 168. The detector 180 comprises a transceiver and associated circuitry that facilitates detection of the reflected pulse(s) 165.

The system 100 also comprises an analyzer component 190 that receives the mixed signal output, e.g., the heterodyned signal 169, from the detector 180. In an aspect, any of mixer element 168, the detector 180, and the analyzer component 190 can be co-located in a single device, where such a device can be an oscilloscope or similar device, as shown by broken line 199. As will be described in greater detail below, the analyzer component 190 receives the heterodyne signal 169 and extracts a central portion of the reflected pulse(s) by, for example, locating and then discarding a leading edge of the pulse(s) and a trailing edge of the pulse(s). The analyzer component 190 is configured to determine a Doppler-shifted frequency for the reflected pulse(s) 165 based at least in part on the extracted central portion of the first pulse. The analyzer component 190 can be further configured to determine a vibration velocity for the reflected pulse(s) 165 based at least in part on the determined Doppler-shifted frequency of the reflected pulse(s) 165. Further, the analyzer component 190 can be configured to determine a vibration frequency for the reflected pulse(s) 165 based at least in part on the determined vibration velocity, wherein the vibration frequency of the reflected pulse(s) 165 can be considered equivalent to the vibration frequency, $\omega_{vib}$, of the target 160.

In an aspect, as previously mentioned (and as further described in FIG. 2), the analyzer component 190 can analyze the central region of a pulse, e.g., by discarding the leading and trailing edges, to determine the Doppler frequency. The Bragg frequency $\omega_B$ is a well-defined RF frequency, which can be known exactly and used as a heterodyning frequency to determine the Doppler-shifted frequency term ($\omega_{Doppler}$) for the pulse(s) 165. As is known in the art, after heterodyning, the Bragg frequency $\omega_B$ can disappear and/or be discarded. As previously mentioned, a small degree of SPM and some arbitrary phase artifacts may also be in existence in a reflected pulse(s) 165, however the magnitude of phase artifacts may be of such a small amount that they have minimal bearing on the Doppler frequency determination and may be ignored.

Since the heterodyning will result in a time varying phase in a form $\omega_{Doppler}t+\Delta\phi_{SPM}+\phi_C$, the analyzer component 190 extracts the Doppler frequency $\omega_{Doppler}$ for one returning pulse. The extracted Doppler frequency is exactly proportional to the speed of the moving surface of object 160, which is related to $\omega_{Doppler}=(v/c)\,\omega_0$ where v is the instantaneous velocity of the moving surface of the object 160 and c is the speed of light (where $\omega_0$ is the carrier frequency of the optical beam). For each returning pulse, the analyzer component 190 extracts the Doppler frequency, which in turn produces the instantaneous speed v of the moving surface of the object 160.

Hence, by knowing the Doppler-shifted frequency of the laser beam (e.g., the Doppler-shifted frequency of the reflected pulse 165), it is possible to determine (e.g., by frequency component 190) $\omega_{vib}$ of the target 160. Owing to the Doppler-shifted frequency corresponding to a velocity of the vibrating target (e.g., for a given first moment in time, $t_1$), by knowing the Doppler-shifted frequency at a point in time, then the velocity $v(t_1)$ of object 160 at time $t_1$ can be calculated. The vibrating speed can be sufficiently slower than the pulse duration of 100 ns. Therefore, the velocity of the moving surface of the object 160 would be a constant during the entire pulse of 100 ns. Consequently, the Doppler frequency and the corresponding surface speed for a single returning pulse would be constant during 100 ns. The Doppler-shifted frequency of the next received reflected pulse 165 (e.g., received at a second moment in time, $t_2$) can be determined, and based at least in part, it is possible to determine the velocity $v(t_2)$ of the target 160 at time $t_2$. Owing to a vibration associated with the target 160 (e.g., the idling engine) there is a likelihood that the vibrating object has moved (e.g., either away from or towards the system 100) between a first position, P1, at the first moment $t_1$ in time and a second position, P2, at the second moment $t_2$ in time, and hence has a slightly different velocity between the Doppler-shifted frequency measured for P1 versus the Doppler-shifted frequency measured for P2. Hence, by repeating the operation of determining the Doppler-shifted frequency for a plurality of pulses and/or times, it is possible to generate a velocity profile for the object 160. By analyzing this velocity profile (for example, performing a Fourier transform on this velocity profile), it is possible to ultimately determine $\omega_{vib}$ of the target 160. Furthermore, if the vibrating target has a complex vibrating spectrum (for example, it can vibrate with more than one $\omega_{vib}$), the entire vibrating frequency spectrum can also be determined using the various embodiments presented herein.

Figure 2:
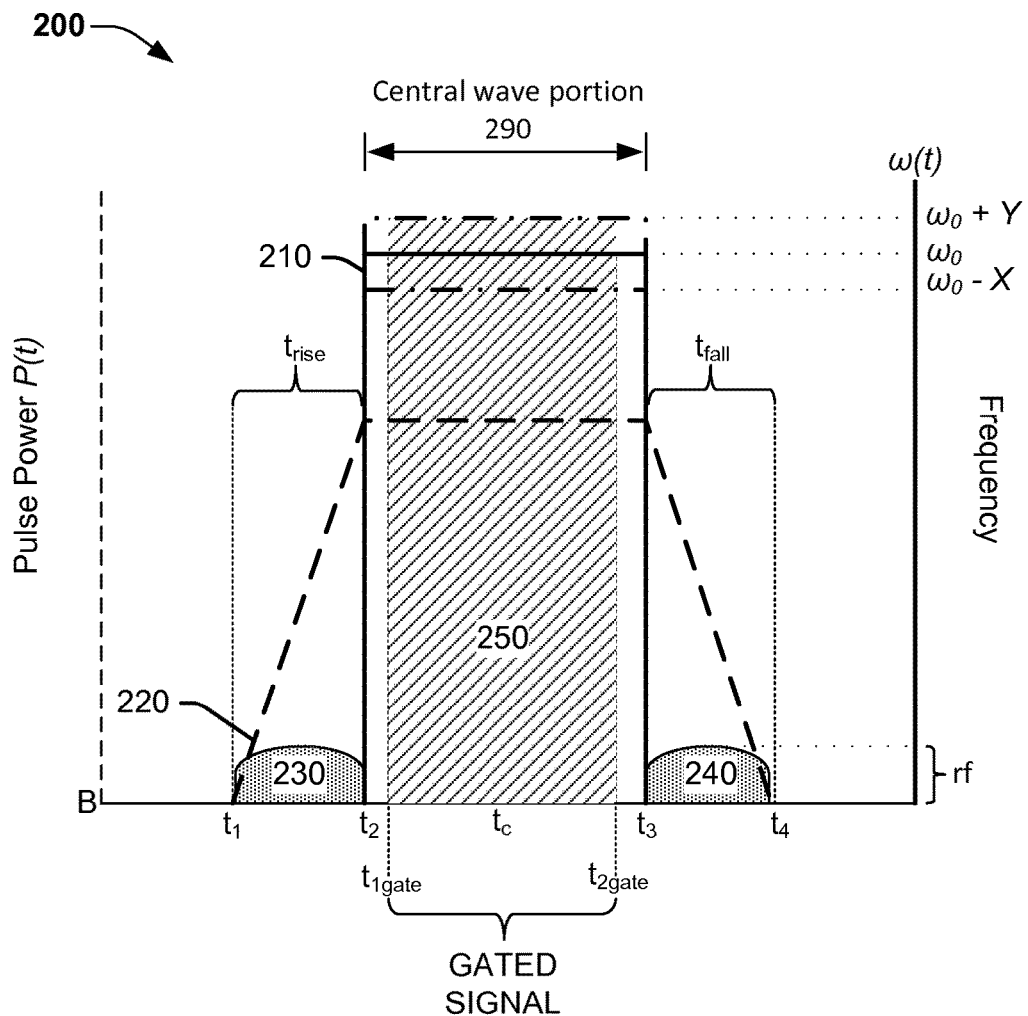
FIG. 2 illustrates a schematic of a radar pulse undergoing time-gating, according to an embodiment.

FIG. 2 presents a schematic 200 illustrating time-gating of a pulse with respect to power and frequency of the pulse. Plot 210 is a plot of frequency versus time for the pulse while plot 220 is a plot of power versus time for the pulse. It is to be appreciated that the respective angles of the power slope incline (e.g., leading edge portion), $t_{rise}$, and the power slope decline (e.g., trailing edge portion), $t_{fall}$, are exaggerated to facilitate understanding of the various embodiments herein and the distances between $t_1$ and $t_2$, and $t_3$ and $t_4$ may be narrower (e.g., with reference to the distance between $t_2$ and $t_3$ in actuality). Regions 230 and 240 indicate unwanted radio frequency (RF) artifacts which could obfuscate Doppler-shifted frequencies (e.g., during signal modulation), whereby the phase noise in regions 230 and 240, engendered through the non-linear phase distortion, could prevent accurate determination of the Doppler-shifted frequency during the same time period. As shown in FIG. 2, both the frequency plot 210 and the power plot 220 have a central portion which has a flat profile. By time-gating, e.g., by only measuring the respective frequency and power between $t_{1gate}$ and $t_{2gate}$, it is possible to isolate the region 290 of plots 210 and 220 (e.g., to facilitate determination of Doppler frequency) and discard the outlying regions (e.g., any signaling falling between $t_1$ and $t_{1gate}$, and $t_{2gate}$ and $t_4$) as previously mentioned. Hence, in the exemplary embodiment presented herein, where a pulse in the transmission signal 146 (and accordingly the reflected pulse 165) has a duration of 100 ns (e.g., the duration of $t_2$ to $t_3$), the time-gated region can be of a duration less than 100 ns. Hence, in an embodiment, the duration of the time-gated region 250, e.g., between $t_{1gate}$ and $t_{2gate}$, can be chosen such that as much of a pulse is processed as possible while having confidence that the outlying regions (e.g., the unwanted RF components) have been discarded. Thus, with reference to the presented example, a time-gated duration of 90 ns may be sufficient for a 100 ns pulse signal, whereby an initial 5 ns is discarded, a 90 ns gated signal is retained and the final 5 ns signaling is discarded.

In an embodiment, the time-gating operation can be performed as a function of identifying the leading edge portion, $t_{rise}$. The beginning of the leading edge portion, i.e., at $t_1$, can be determined based upon detecting an energy of a pulse 165 increasing from a zero or background energy level (e.g., a base energy level). For example, as a plurality of reflected pulses are received at a receiver (e.g., detector 180 and/or analyzer component 190) during the periods where no pulses are received the energy level may be of, or near, zero energy, or the energy level may be equivalent to a background level (e.g., atmospheric energy), as shown as B on FIG. 2. As a pulse 165 is received, the energy associated with the existence of the pulse 165 can be determined. By detecting the increase in energy from the background level, the beginning of the leading edge portion at $t_1$ can be determined.

A variety of operations can be undertaken to facilitate extraction of the time-gated region 250 (e.g., by detector 180 and/or analyzer component 190). In an embodiment, a delay of a defined duration (e.g., $t_1$ to $t_{1gate}$) can be introduced such that the gated signal portion 250 is not initiated until the energy of the pulse 165 is in the flat-top portion of the square-wave. Hence, continuing the current example, where $t_{rise}$ can have a duration of 3 ns, upon detecting the increase in energy at $t_1$ a delay of 8 ns can be utilized with $t_{gate}$ occurring 5 ns after the energy in pulse 165 has flattened out starting at $t_2$. Subsequently, the gated signal can be obtained for a defined duration (e.g., defined as 90 ns for a 100 ns pulse), e.g., between $t_{2gate}$ and $t_{2gate}$. Upon $t_{2gate}$ being reached the remainder of the pulse 165 (e.g., $t_{2gate}$ to $t_3$ through to $t_4$) can be considered to be extraneous and is discarded to minimize the possibility of washing out the time-gated portion of the pulse 165. In another embodiment, each individual pulse can be identified, and a central point in each pulse, $t_c$, can be identified. Based upon $t_c$ being known, the gated period 250 can be extracted from the pulse in accord with a defined time period, e.g., continuing the above example, $t_c \pm 45$ ns (e.g., $t_{1gate} < t_c < t_{2gate}$), and the central 90 ns of the pulse 165 is extracted.

As further shown in FIG. 2, as an object vibrates there is a corresponding change in frequency $\omega$. Hence, as shown the frequency can shift about $\omega_0$, e.g., $\omega_0 - X$ to $\omega_0$ to $\omega_0 + Y$, where X and Y are any real numbers and X=Y or X # Y. In an aspect, as the vibrational motion of the object causes the object to move toward (approach) the measuring system (e.g., system 100) the Doppler frequency of the object increases, e.g., $\omega_0 + Y$. However, as the vibrational motion of the object causes the object to move away (recede) from the measuring system the Doppler frequency of the object decreases, e.g., $\omega_0 - X$. By measuring the received stream of reflected pulses 165 as a function of time, and the respective frequency, it is possible to determine the variation in the Doppler frequency (e.g., the Doppler shifted frequency) of the object. By knowing the Doppler shifted frequency, it is possible to determine the vibration velocity and hence, the vibration frequency $\omega_{vib}$ of the object, where the frequency can be determined based upon a vibration (or oscillation) about a mean position or a velocity with respect to the position of the system 100, e.g., the object is moving towards the system, the object is moving away from the system, etc.

Figure 3:
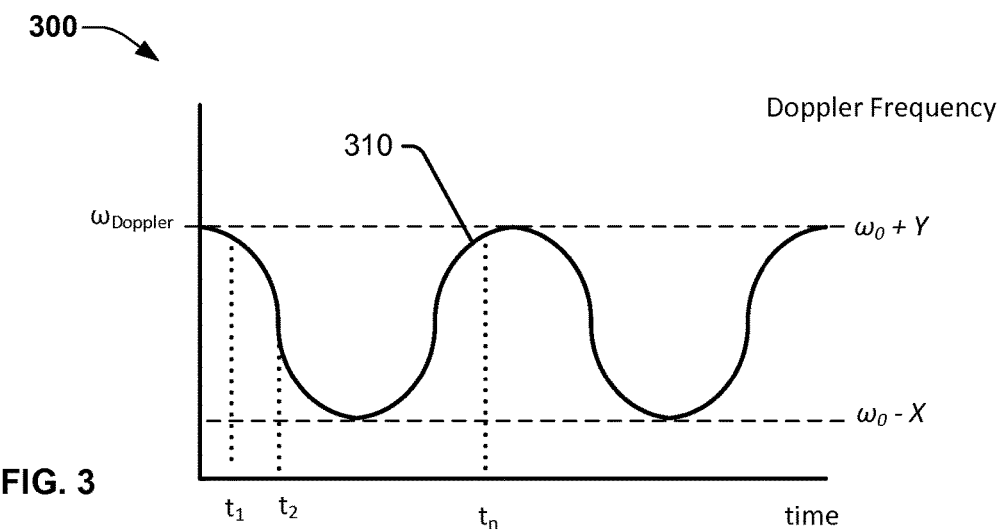
FIG. 3 illustrates a plot of a variation in Doppler frequency for a plurality of reflected radar pulses as a function of time, according to an embodiment.
Figure 4:
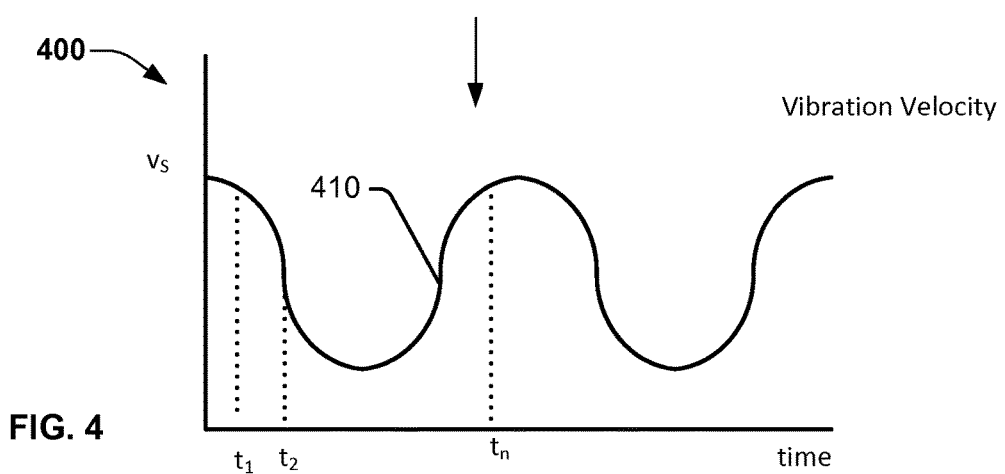
FIG. 4 illustrates a plot of a variation in vibration velocity for a plurality of reflected radar pulses as a function of time, according to an embodiment.
Figure 5:
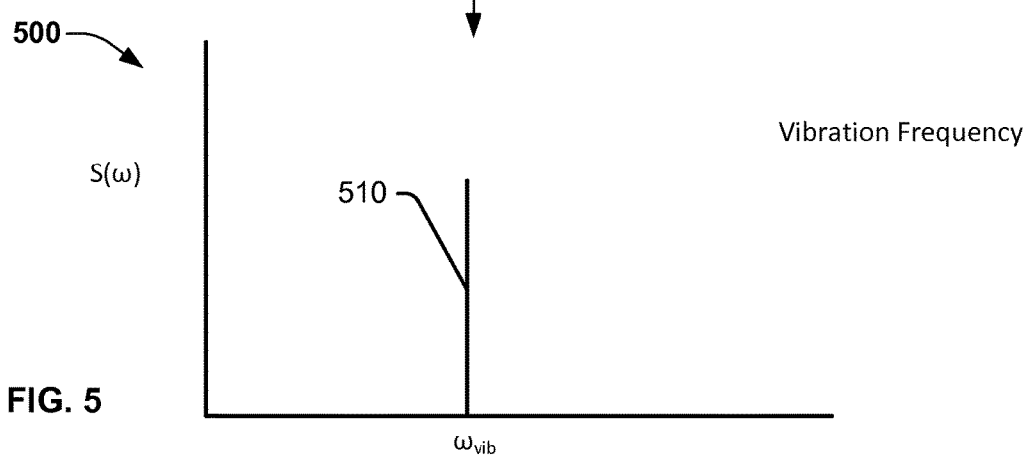
FIG. 5 illustrates a plot of a determined vibration frequency for a plurality of reflected radar pulses as a function of time, according to an embodiment.

FIGS. 3-5 illustrate the stages involved in the determination of vibration frequency from the Doppler frequency. Plot 310 presents a plot of $\omega_{Doppler}$ versus time for Doppler-shifted frequency, where the Doppler-shifted frequency can be obtained by demodulating the received signal 165, and has further been time-gated (as shown in FIG. 2) to facilitate discarding the various deleterious components and extraction of the Doppler-shifted frequency for a plurality of pulses as a function of time, e.g., $t_1, t_2, \ldots t_n$, to facilitate generation of the plot 310. The Doppler-shifted frequency can be of any magnitude, e.g., 5 kHz, 10 kHz, 50 kHz, etc. FIG. 4, plot 410, presents a plot of vibration versus time to facilitate determination of vibration velocity. FIG. 5, line 510 indicates the vibration frequency, $\omega_{vib}$, determined from the vibration velocity, with the determination as is known in the art.

Figure 6:
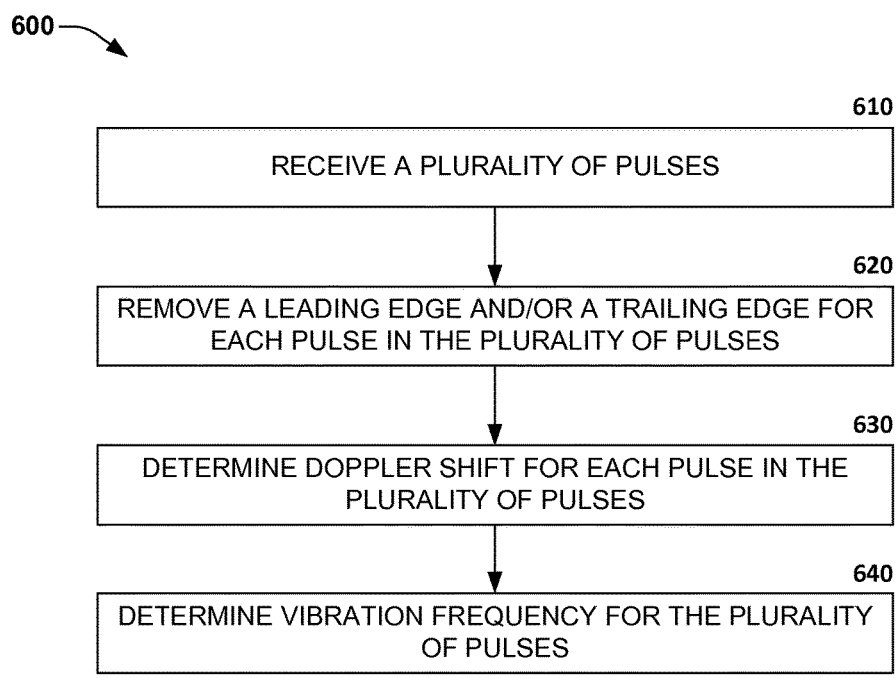
FIG. 6 is a flow diagram illustrating an exemplary methodology for time gating at least one radar waveform.

FIG. 6 is an exemplary methodology relating to determining the vibration frequency of an object. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

At 610, a plurality of radar pulses that have a particular waveform (e.g., square-waves) are received. In an embodiment, the pulses can be reflected or scattered from a target, where the pulses can be transmitted by a radar system and received at the same radar system. For example, the pulse transmitter and pulse receiver are co-located at the same system (e.g., forming a transceiver), or alternatively, the pulse transmitter and pulse receiver are located at disparate locations to each other.

At 620, at least one of the leading edge and/or the trailing edge for each received pulse can be discarded to facilitate removal of any signaling that may deleteriously affect determination of Doppler shifting of the pulse and, subsequently, determination of the vibration frequency of the pulse(s). As previously described, for each received pulse, the leading edge can be determined and hence act as a trigger for a time-gating operation. For example, a transmitted pulse can have a square, flat-top profile, such as formed by a modulator component operating on a CW signal. However, the pulse-forming operation may cause the pulse to have a profile that is not exactly 'square' and rather has a trapezoidal profile (as shown in FIG. 2). Further processing and transmission of the pulse can further lead to the generation of other deleterious effects as well as amplification of any generated effects. The unwanted effects (e.g., operating in a non-linear manner) can cause a Doppler-shift in frequency to be 'washed-out'. In an aspect, the deleterious effects can be confined to the leading edge and trailing edge portions of a pulse waveform, and hence, by time-gating the received pulse(s) it is possible to remove the unwanted effects and, accordingly, extract a portion of the received pulse waveform to facilitate Doppler-shift determination.

At 630, based upon the removal of at least one of the leading edge and/or the trailing edge, the Doppler-shifted frequency can be determined. For example, a determination can be made regarding frequency of the received pulse (e.g., $\omega_{Doppler}$) relative to the frequency of the transmitted pulse (e.g., $\omega_0$). The Doppler-shifted frequency of the received pulse can be determined based upon a reference signal generated from a common laser beam utilized to also form a plurality of transmittable pulses, wherein the transmittable pulses are subsequently transmitted in the direction of the target (wherein the transmitted pulses form the plurality of scattered pulses). The Doppler-shifted frequency of the received pulse can be determined based at least in part upon a difference between the frequency of the received pulse and the frequency of the reference signal.

At 640, based at least upon the determined Doppler-shift frequency, the vibration frequency of a target can be determined, as is known in the art, per FIGS. 3-5.

Figure 7:
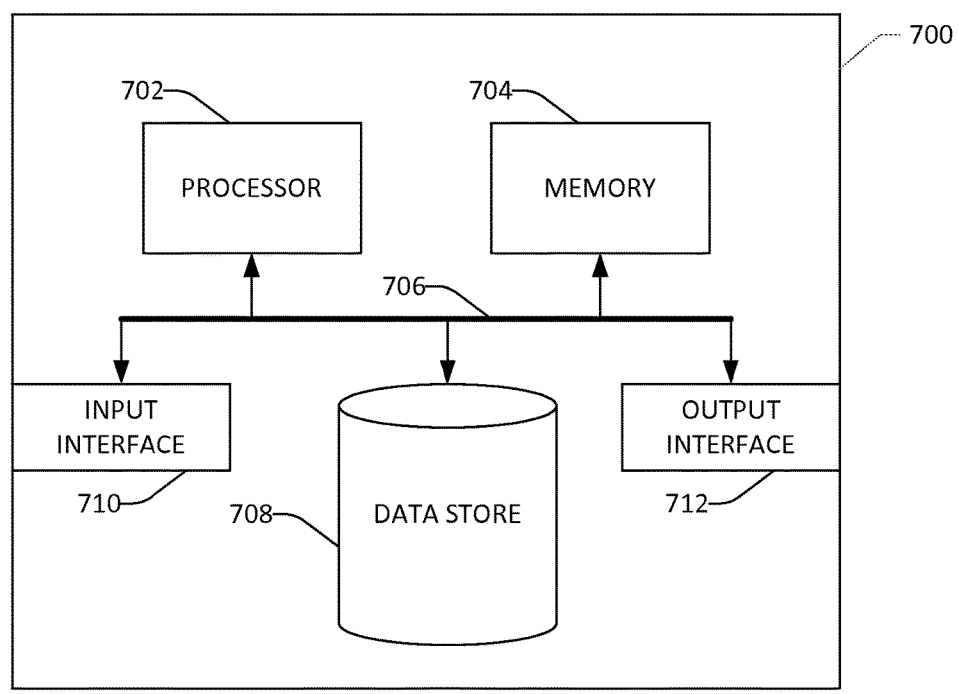
FIG. 7 illustrates an exemplary computing device.

Referring now to FIG. 7, a high-level illustration of an exemplary computing device 700 that can be used in accordance with the systems and methodologies disclosed herein is illustrated. For instance, the computing device 700 may be utilized to perform any of the functions presented herein relating to the various embodiments, where such functions can include generating one or more pulses having a particular waveform, frequency, energy, etc., transmission of the one or more pulses, receipt of one or more pulses reflected from a target, time-gating of the one or more received pulses, determining a Doppler-shifted frequency, determining a vibration velocity, determining a vibration frequency, etc. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store operating parameters, required operating parameters, and so forth.

The computing device 700 additionally includes a data store 708 that is accessible by the processor 702 by way of the system bus 706. The data store 708 may include executable instructions, operating parameters, required operating parameters, etc., such as pulse waveform parameters, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc., by way of the output interface 712, e.g., a pulse profile.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a laser that is configured to emit a continuous wave laser beam, wherein an optical reference signal is generated based upon the continuous wave laser beam emitted by the laser;
   a modulator optically coupled to the laser, wherein the modulator emits a sequence of optical square pulses based upon the continuous wave laser beam emitted by the laser;
   an amplifier optically coupled to the modulator, wherein the amplifier emits an amplified optical signal based upon the sequence of square pulses emitted by the modulator;
   a lens optically coupled to the amplifier, wherein a collimated optical signal is emitted from the lens based upon the amplified optical signal and is directed towards a target, the collimated optical signal includes a sequence of pulses, the sequence of pulses include non-linear effects induced by the modulator and the amplifier;

a mixer element that is configured to:
  mix a received optical signal with the optical reference signal to form an optical heterodyne signal, wherein the received optical signal comprises the sequence of pulses that have reflected off of the target, and further wherein the optical heterodyne signal comprises:
    a first pulse, the first pulse comprises:
      a leading edge portion that includes a first non-linear effect in the non-linear effects;
      a trailing edge portion that includes a second non-linear effect in the non-linear effects; and
      a central portion, the central portion is located between the leading edge portion and the trailing edge portion;
a detector that detects the optical heterodyne signal and outputs an electrical mixed signal based upon optical heterodyne signal, the electrical mixed signal comprises the first pulse; and
an analyzer component that is configured to:
  extract the central portion of the first pulse from the electrical mixed signal, the extraction based at least in part on discarding the leading edge portion of the first pulse and the trailing edge portion of the first pulse;
  determine a Doppler-shifted frequency from the central portion of the first pulse of the electrical mixed signal;
  determine, based upon the extracted Doppler-shifted frequency, a frequency of vibration of the vibrating target; and
  output an indication that the vibrating target is vibrating at the frequency of vibration responsive to determining the frequency of vibration of the vibrating target.

2. The system of claim 1, wherein the optical heterodyne signal further comprises:
  a second pulse, the second pulse comprises:
    a second leading edge portion that includes a third non-linear effect in the non-linear effects;
    a second trailing edge portion that includes a fourth non-linear effect in the non-linear effects; and
    a second central portion, the second central portion is located between the second leading edge portion and the second trailing edge portion, wherein the electrical mixed signal comprises the second pulse, and further wherein the analyzer component is further configured to:
      extract the second central portion of the second pulse of the electrical mixed signal; and
      determine the frequency of vibration of the vibrating target based upon a determined second Doppler-shifted frequency for the second pulse, wherein the second Doppler-shifted frequency is determined based upon the extracted central portion of the second pulse.

3. The system of claim 2, wherein the analyzer component is further configured to determine the vibration frequency of the vibrating target based at least in part on a first velocity determined for the first pulse and a second velocity determined for the second pulse.

4. The system of claim 1, wherein the sequence of pulses are radar pulses.

5. The system of claim 1, wherein a transmitter comprises the laser, the modulator, the amplifier, and the lens.

6. The system of claim 1, further comprising a beam splitter optically positioned between the laser and the modulator, the beam splitter receives the continuous wave laser beam, wherein the beam splitter emits a first optical beam that is received by the modulator and a second optical beam, wherein the optical reference signal is based upon the second optical beam.

7. The system of claim 1, wherein the continuous wave laser beam is a narrow-band laser beam.

8. The system of claim 7, wherein the narrow-band laser beam has a wavelength of between 500 nanometers and 2 micrometers.

9. The system of claim 8, wherein the narrow-band laser beam has a bandwidth of less than 100 kHz.

10. The system of claim 1, wherein the analyzer component is configured to extract the central portion of the first pulse of the electrical mixed signal when the target is in motion.

11. The system of claim 10, wherein the analyzer component is configured to determine that the vibrating target is an idling vehicle based upon the frequency of vibration.

12. The system of claim 1, wherein the mixer element, the detector, and the analyzer component are included in a same device.

13. The system of claim 6, further comprising an acousto-optic filter optically coupled to the beam splitter, wherein the optical reference signal is based upon an output of the acousto-optic filter.

* * * * *